United States Patent
Arndt et al.

(10) Patent No.: US 9,529,760 B1
(45) Date of Patent: *Dec. 27, 2016

(54) TOPOLOGY SPECIFIC REPLICATED BUS UNIT ADDRESSING IN A DATA PROCESSING SYSTEM

(71) Applicant: INTERNATIONAL BUSINESS MACHINES CORPORATION, Armonk, NY (US)

(72) Inventors: Richard L. Arndt, Austin, TX (US); Florian Auernhammer, Adliswil (CH); Hugh Shen, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,751

(22) Filed: Mar. 28, 2016

Related U.S. Application Data

(63) Continuation of application No. 14/960,507, filed on Dec. 7, 2015.

(51) Int. Cl.
*G06F 13/40* (2006.01)
*G06F 13/24* (2006.01)
(Continued)

(52) U.S. Cl.
CPC ........... *G06F 13/404* (2013.01); *G06F 9/3004* (2013.01); *G06F 9/30043* (2013.01);
(Continued)

(58) Field of Classification Search
None
See application file for complete search history.

(56) References Cited

U.S. PATENT DOCUMENTS

| | | | | |
|---|---|---|---|---|
| 4,564,900 A | * | 1/1986 | Smitt | G06F 11/2017 709/212 |
| 5,638,516 A | * | 6/1997 | Duzett | G06F 15/17381 709/229 |

(Continued)

OTHER PUBLICATIONS

'A New Solution to Coherence Problems in Multicache Systems' by Censier and Feautrier, IEEE Transactions on Computers, vol. c-27, No. 12, Dec. 1978.*

(Continued)

*Primary Examiner* — Steven Snyder
(74) *Attorney, Agent, or Firm* — Brian F. Russell; Steven L. Bennett

(57) ABSTRACT

A technique for handling cache-inhibited operations in a data processing system includes receiving, at a replicated bus unit, a cache-inhibited (CI) operation. The replicated bus unit determines whether an address associated with the CI operation matches an address for the replicated bus unit and whether a source indicated by the CI operation is associated with the replicated bus unit. In response to the address associated with the CI operation matching the address for the replicated bus unit and the source indicated by the CI operation being associated with the replicated bus unit, the replicated bus unit processes the CI operation. In response to the address associated with the CI operation not matching the address for the replicated bus unit or the source indicated by the CI operation not being associated with the replicated bus unit, the replicated bus unit ignores the CI operation.

8 Claims, 6 Drawing Sheets

(51) Int. Cl.
  *G06F 13/364* (2006.01)
  *G06F 13/42* (2006.01)
  *G06F 12/08* (2016.01)
  *G06F 9/38* (2006.01)
  *G06F 13/28* (2006.01)
  *G06F 9/30* (2006.01)
  *G06F 9/54* (2006.01)

(52) U.S. Cl.
  CPC ............ *G06F 9/3891* (2013.01); *G06F 9/544* (2013.01); *G06F 12/0815* (2013.01); *G06F 12/0831* (2013.01); *G06F 12/0875* (2013.01); *G06F 12/0888* (2013.01); *G06F 13/24* (2013.01); *G06F 13/28* (2013.01); *G06F 13/364* (2013.01); *G06F 13/4282* (2013.01); *G06F 2212/452* (2013.01)

(56) References Cited

U.S. PATENT DOCUMENTS

| | | | | |
|---|---|---|---|---|
| 5,809,533 A * | 9/1998 | Tran | ............ | G06F 13/4217 710/311 |
| 6,205,508 B1 * | 3/2001 | Bailey | ............ | G06F 13/26 710/260 |
| 6,266,744 B1 * | 7/2001 | Hughes | ............ | G06F 9/3834 711/123 |
| 6,295,573 B1 * | 9/2001 | Bailey | ............ | G06F 13/24 710/260 |
| 6,516,368 B1 * | 2/2003 | Arimilli | ............ | G06F 12/0831 710/107 |
| 6,591,321 B1 * | 7/2003 | Arimilli | ............ | G06F 12/0831 710/100 |
| 7,085,898 B2 * | 8/2006 | Blake | ............ | G06F 12/0831 370/460 |
| 7,657,683 B2 * | 2/2010 | Sridhar | ............ | G06F 9/4812 710/260 |
| 7,895,407 B2 * | 2/2011 | Dankel | ............ | G06F 12/0284 711/170 |
| 8,484,307 B2 * | 7/2013 | Arimilli | ............ | G06F 9/544 709/213 |
| 8,521,977 B2 * | 8/2013 | Ueki | ............ | G06F 12/1466 711/163 |
| 8,675,444 B2 * | 3/2014 | Dodson | ............ | G06F 13/16 365/226 |
| 8,867,304 B2 * | 10/2014 | Dodson | ............ | G06F 13/16 365/226 |
| 9,081,501 B2 * | 7/2015 | Asaad | ............ | G06F 15/76 |
| 9,092,272 B2 * | 7/2015 | Jea | ............ | G06F 9/52 |
| 9,104,501 B2 * | 8/2015 | Jea | ............ | G06F 9/52 |
| 9,110,718 B2 * | 8/2015 | Moir | ............ | G06F 9/50 |
| 2004/0230751 A1 * | 11/2004 | Blake | ............ | G06F 12/0831 711/147 |
| 2005/0102559 A1 * | 5/2005 | Hyytianen | ............ | G06F 11/2033 714/13 |
| 2006/0150007 A1 * | 7/2006 | Gostynski | ............ | G06F 11/3632 714/12 |
| 2008/0209134 A1 * | 8/2008 | Fields | ............ | G06F 9/30003 711/146 |
| 2011/0219208 A1 * | 9/2011 | Asaad | ............ | G06F 15/76 712/12 |
| 2013/0019085 A1 * | 1/2013 | Cain, III | ............ | G06F 9/3804 712/233 |
| 2013/0151867 A1 * | 6/2013 | Dodson | ............ | G06F 13/16 713/300 |
| 2013/0152101 A1 * | 6/2013 | Jea | ............ | G06F 9/522 718/104 |
| 2013/0152103 A1 * | 6/2013 | Jea | ............ | G06F 9/522 718/104 |
| 2013/0173867 A1 * | 7/2013 | Ueki | ............ | G06F 12/1466 711/152 |
| 2013/0304997 A1 * | 11/2013 | Dodson | ............ | G06F 13/16 711/153 |
| 2014/0089591 A1 * | 3/2014 | Moir | ............ | G06F 9/50 711/130 |
| 2015/0293844 A1 * | 10/2015 | Still | ............ | G06F 12/1072 711/217 |
| 2015/0293863 A1 * | 10/2015 | Still | ............ | G06F 12/1072 710/308 |
| 2016/0011996 A1 * | 1/2016 | Asaad | ............ | G06F 15/76 710/308 |

OTHER PUBLICATIONS

'PowerQUICC Data Cache Coherency' by Freescale Semiconductor, Application Note, AN3544, Rev. 0, Dec. 2007.*
'e500mc Core Reference Manual' by Freescale Semiconductor, Rev. 3, Mar. 2013.*
'Coherence Controller Architectures for SMP-Based CC-NUMA Multiprocessors' by Michael et al., copyright 1997 by ACM.*

* cited by examiner

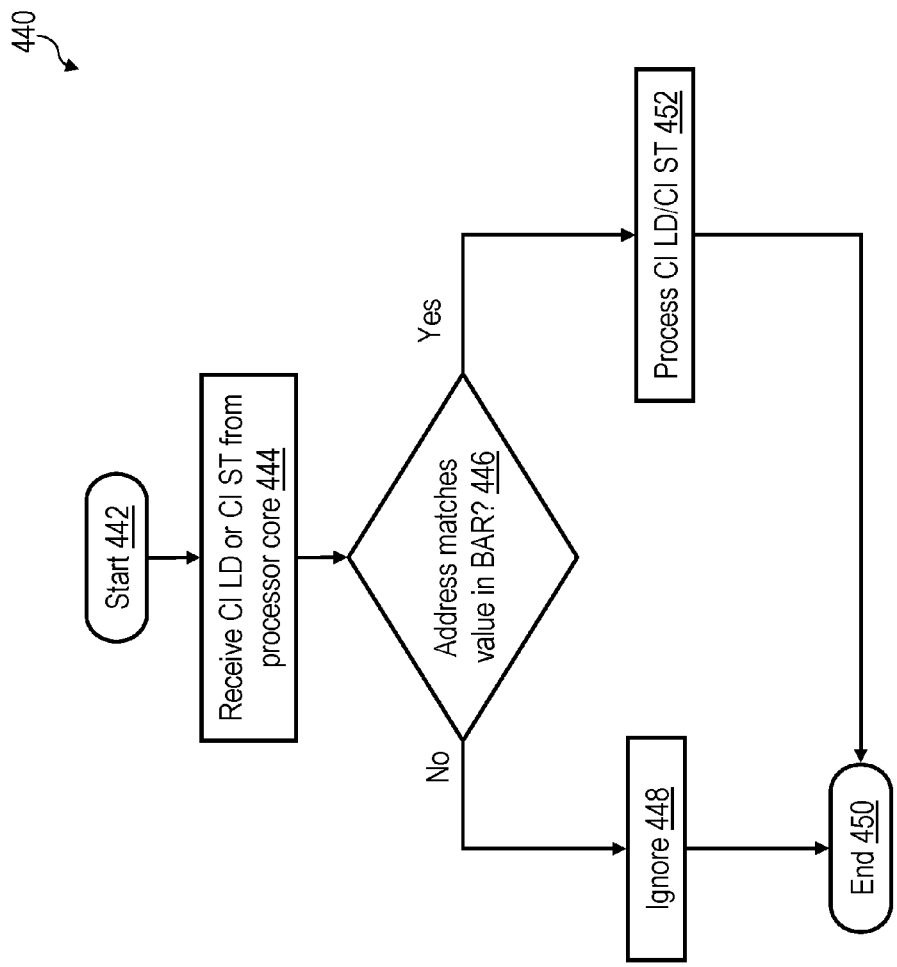

TOPOLOGY SPECIFIC REPLICATED BUS UNIT ADDRESSING IN A DATA PROCESSING SYSTEM

BACKGROUND

The present disclosure is generally directed to addressing replicated bus units and, more particularly, to techniques for addressing topology specific replicated bus units in a data processing system. Topology specific replicated bus units (TSRBUs) are typically functional units replicated across a data processing system, possibly at varying levels of the interconnect hierarchy, with each TSRBU interacting with a specific subset of processors within the system. A commonly occurring TSRBU is an interrupt controller.

In computing, an interrupt controller is a device that is used to combine several interrupt sources on one or more processor core lines, while allowing priority levels to be assigned to interrupt outputs. Interrupt controllers typically have a common set of registers (e.g., an interrupt request register (IRR), an in-service register (ISR), and an interrupt mask register (IMR). The IRR specifies which interrupts are pending acknowledgement and is typically a symbolic register that cannot be directly accessed. The ISR register specifies which interrupts have been acknowledged, but are still waiting for an end of interrupt (EOI) signal. The IMR specifies which interrupts are to be ignored and not acknowledged. In general, an interrupt controller may have up to two distinct interrupt requests outstanding at one time (e.g., one interrupt request waiting for acknowledgement, and one interrupt request waiting for an EOI). An interrupt controller may implement hard priorities, specific priorities, or rotating priorities and interrupts may be edge-triggered or level-triggered.

Addressing a TSRBU, e.g., an interrupt controller, has conventionally employed a unique address for each TSRBU in a data processing system. Given that each TSRBU has required software to utilize a different address to communicate with the TSRBU as the software is moved from one processor core to another processor core, user level software has conventionally been required to communicate indirectly with a TSRBU via system control software such as a hypervisor or operating system (OS). Requiring software to utilize a different address to communicate with different TSRBUs through system control software increases operating complexity.

BRIEF SUMMARY

Disclosed are a method, a data processing system, and a computer program product (e.g., in the form of a design file embodied in a computer-readable storage device) for addressing topology specific replicated bus units.

A technique for handling cache-inhibited operations in a data processing system includes receiving, at a replicated bus unit, a cache-inhibited (CI) operation. The replicated bus unit determines whether an address associated with the CI operation matches an address for the replicated bus unit and whether a source indicated by the CI operation is associated with the replicated bus unit. In response to the address associated with the CI operation matching the address for the replicated bus unit and the source indicated by the CI operation being associated with the replicated bus unit, the replicated bus unit processes the CI operation. In response to the address associated with the CI operation not matching the address for the replicated bus unit or the source indicated by the CI operation not being associated with the replicated bus unit, the replicated bus unit ignores the CI operation.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 4B depicts a flowchart of an exemplary process implemented by a replicated bus unit included in one the PCs of FIG. 1 to handle a CI operation, according to one embodiment of the present disclosure;

DETAILED DESCRIPTION

Figure 1:
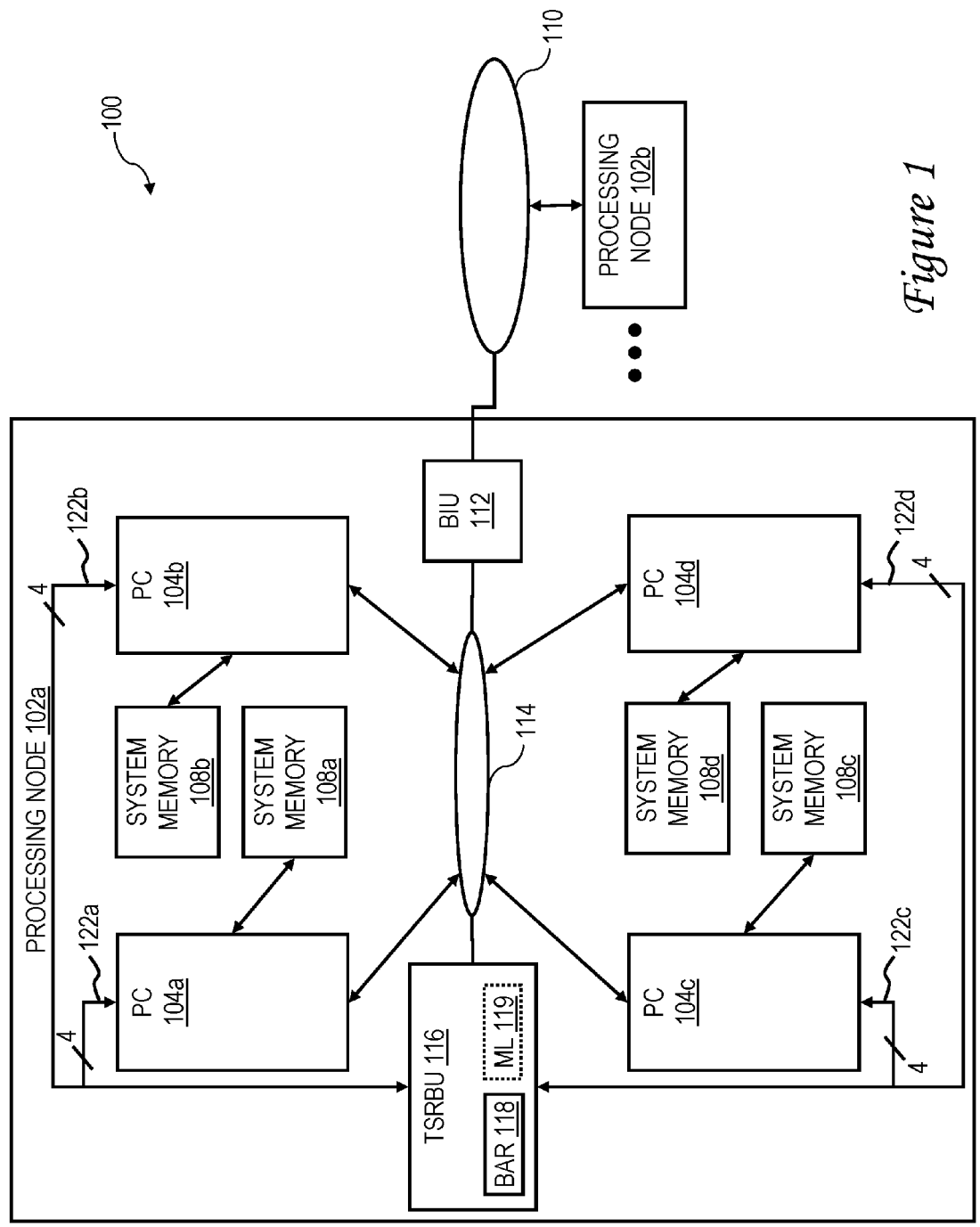
FIG. 1 is a diagram of a relevant portion of an exemplary data processing system that includes multiple processing nodes, each of which includes multiple processing clusters (PCs) configured according to one or more embodiments of the present disclosure.

The illustrative embodiments provide a method, a data processing system, and a computer program product (e.g., in the form of a design file embodied in a computer-readable storage device) for addressing topology specific replicated bus units (TSRBUs), e.g., interrupt controllers.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As may be used herein, the term 'scope' refers to a level, e.g., processing cluster level, processing node level, or data processing system level, at which an operation is issued.

As noted above, addressing a TSRBU, e.g., an interrupt controller, has conventionally employed a unique address for each instance of the TSRBU. As a software thread is moved from one physical hardware thread to another, the TSRBU associated with the software thread may change. In such a conventional system, determining the appropriate address to access a TSRBU is significant burden. Further, user level threads typically cannot be given access to TSRBUs associated with other threads due to system integrity concerns (e.g., a given software thread could corrupt the state of another software thread's TSRBU). For these reasons, among others, user level software has conventionally communicated indirectly with an interrupt controller via system control software. Unfortunately, communicating through system control software decreases performance and increases complexity. It would therefore be advantageous to provide a mechanism that allows user level software to directly access TSRBUs utilizing a single address that maps to an appropriate TSRBU instance for the given physical location of the hardware thread.

Software threads executing on processor cores often communicate with TSRBUs utilizing cache-inhibited load and store instructions. Cache-inhibited (CI) load-CI load—and store-CI store—instructions are load and store instructions that neither access nor populate caches, but instead directly access memory and/or devices through CI load and CI store bus operations. As used herein, 'CI LD' is used interchangeably to refer to a CI load instruction or bus operation and similarly 'CI ST' is used interchangeably to refer to a CI store instruction or bus operation. According to one aspect of the present disclosure, CI LDs and CI STs within a specific pre-defined address range are broadcast only within a certain portion of a data processing system. For example, a CI LD and/or CI ST may only be broadcast within a processing cluster (PC), e.g., included in a local chip possibly containing multiple processing cores.

In general, limiting the broadcast scope of CI LDs and CI STs allows a set of TSRBUs replicated in a data processing system at that scope level (one TSRBU instance per scope instance) to all be addressed using the same address. Having the functional unit initiating the CI LD or CI ST limit the scope of the CI LD or CI ST allows the addressed TSRBU to be guaranteed that the CI LD or CI ST is from a thread serviced by that specific TSRBU instance. By limiting the broadcast scope at the initiating functional unit, the CI LD and CI ST operations are visible only to the TSRBU associated with the thread issuing the CI LD or CI ST. An additional field within the CI LD or CI ST operation delivered to the TSRBU, allows the TSRBU to determine which particular thread (and processor core) issued the CI LD or CI ST and process the CI LD or CI ST on behalf of that issuing thread. In this manner, user level software may utilize a fixed address to access a given group of TSRBUs and the underlying limited broadcast scope ensures that only the appropriate instance of the TSRBU observes and processes the CI LD or CI ST.

According to one aspect of the present disclosure, one or more base address registers (BARs) are added to a storage subsystem. In this case, all CI LD and CI ST operation addresses are compared to an address stored in a BAR of the storage subsystem. If a matching CI LD or CI ST address is detected, the CI LD or CI ST is restricted to only broadcast to an associated scope, e.g., processing cluster or processing node, indicated by a scope field of the appropriate BAR. In at least one embodiment, each TSRBU (e.g., at a processing cluster level and a processing node level) also includes a BAR that is loaded with a level appropriate address. In this embodiment, a TSRBU only responds to CI operations whose address matches a value stored in the TSRBU BAR.

However, some data processing systems do not provide the ability to limit the broadcast scope of CI LD and CI ST operations and/or the replication of TSRBUs may not have one replicated TSRBU per broadcast scope. For these reasons, among other reasons, in another aspect of the present disclosure, an alternative means of allowing single address addressing of replicated TSRBUs in such systems is provided. In this alternate embodiment, each CI LD and CI ST operation may be broadcast in such a way that multiple TSRBUs may observe the operation either by the operation being broadcast to the entire data processing system or to some subset of the data processing system possibly containing multiple TSRBUs associated with the given address. In this case, each CI LD and CI ST operation includes a source identifier specifying the source processor and thread of the CI LD and CI ST operation. In such systems, when a TSRBU receives a CI LD or CI ST operation whose address matches the BAR in the TSRBU, the TSRBU further qualifies the access by examining the source identifier to determine if the CI LD or CI ST operation was sourced from a thread that is serviced by the given instance of the TSRBU. The set of threads that are serviced by a given TSRBU can be assigned as fixed function of the topology of the data processing system, or may dynamically change. Each thread is assigned to one and only one TSRBU. The mapping function indicating which threads are serviced by a given instance of a TSRBU may be implemented at the TSRBU with a mapping logic function. If the mapping function indicates that a given CI LD or CI ST is from a thread not serviced by the given TSRBU, the CI LD or CI ST is ignored by the TSRBU. In this manner, TSRBUs can be addressed by user level software utilizing the same address, and only the appropriate TSRBU will process any given CI LD or CI ST operation, if necessary.

With reference to FIG. 1, a high level block diagram of an exemplary embodiment of a cache coherent symmetric multiprocessor (SMP) data processing system 100, configured in accordance with the present disclosure, is illustrated. As shown, data processing system 100 includes multiple processing nodes 102*a*, 102*b* for processing data and instructions. While only two processing nodes are illustrated in FIG. 1 it should be appreciated that a data processing system configured according to the present disclosure may include more or less than two processing nodes. Processing nodes 102*a*, 102*b* are coupled to a system interconnect 110 for conveying address, data, and control information between processing nodes 102*a*, 102*b*. System interconnect 110 may be implemented, for example, as a bused interconnect, a switched interconnect, or a hybrid interconnect.

In the depicted embodiment, each processing node 102 may be realized as a multi-chip module (MCM) containing four processing clusters (PCs) 104a-104d, each of which may be realized as a respective integrated circuit (IC). It should be appreciated that a processing node configured according to the present disclosure may include more or less than four processing clusters. The processing clusters 104a-104d within each processing node 102 are coupled for communication by a local interconnect 114, which, like system interconnect 110, may be implemented with one or more buses and/or switches. As is illustrated, TSRBU 116 includes a BAR 118 that stores an address (e.g., address '2000') of TSRBU 116, which is implemented at a processing node 102 level. In one embodiment of the present invention, mapping logic (ML) 119 provides a mapping function that determines which threads on which processing cores are associated with TSRBU 116. TSRBU 116 is coupled to each PU 200 (see FIG. 2) in PC 104 via communication lines 122, sixteen of which are illustrated in FIG. 1. As is shown, four communication lines 122a are illustrated between TSRBU 116 and PC 104a, four communication lines 122b are illustrated between TSRBU 116 and PC 104b, four communication lines 122c are illustrated between TSRBU 116 and PC 104c, and four communication lines 122d are illustrated between TSRBU 116 and PC 104d. It should be appreciated that each communication line 122 may include more than one wire or trace.

Local interconnect 114 is coupled for communication to system interconnect 110 via a bus interface unit 112, which provides logic for communicating signals between local interconnect 114 and system interconnect 110. Data and instructions residing in system memories 108 can generally be accessed and modified by a processor core in any processing cluster 104 in any processing node 102 of data processing system 100. In alternative embodiments, one or more system memories 108 can be coupled to local interconnect 114 and/or system interconnect 110 rather than processing clusters 104.

Those skilled in the art will appreciate that data processing system 100 can include many additional components, such as interconnect bridges, non-volatile storage, ports for connection to networks or attached devices, etc. For brevity, additional components that are not necessary for an understanding of the present disclosure are not illustrated in FIG. 1 or discussed further herein. It should also be understood, however, that the enhancements provided by the present disclosure are applicable to data processing systems of diverse architectures and are in no way limited to the generalized data processing system architecture illustrated in FIG. 1.

Figure 2:
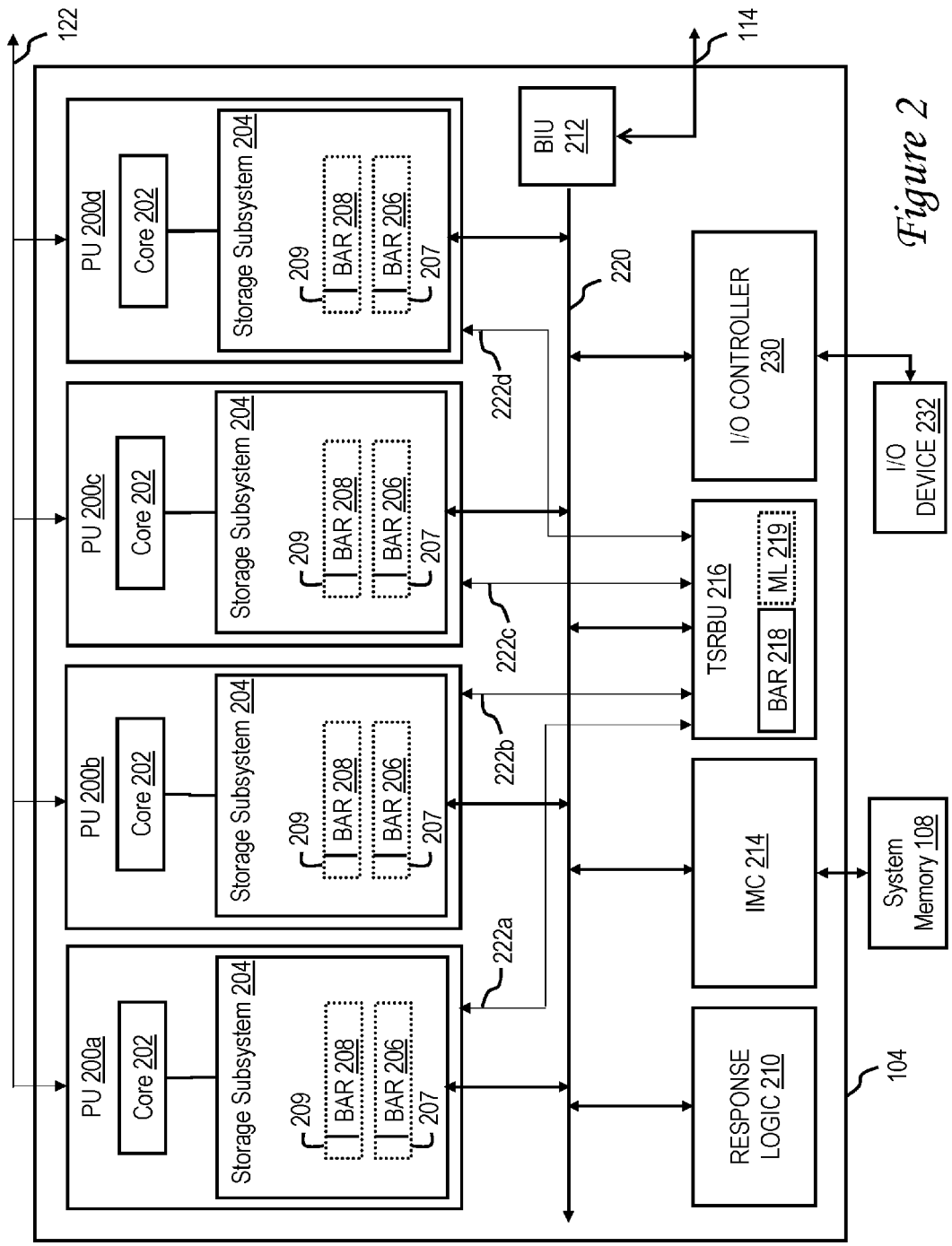
FIG. 2 is a diagram of a relevant portion of one of the PCs of FIG. 1, which includes multiple processing units (PUs), configured according to an embodiment of the present disclosure.

Referring now to FIG. 2, a more detailed block diagram of an exemplary processing cluster 104 in accordance with an embodiment of the present disclosure is illustrated. In the depicted embodiment, each processing cluster 104 includes four processing units (PUs) 200a-200d for independently processing instructions and data. Each PU 200a-200d is coupled to communication line 122 for communicating with TSRBU 116. While four processing units are illustrated in FIG. 2, it should be appreciated that a data processing system configured according to the present disclosure may include processing clusters with more or less than four processing units. Each processing unit 200 includes a processor core 202 that is coupled to a storage subsystem 204, which includes a base address register (BAR) 206 that is configured to store a value, among other information, that corresponds to an address of an associated TSRBU 216 at a processing cluster level and a base address register (BAR) 208 that is configured to store a value, among other information, that corresponds to an address of an associated TSRBU 116 at a processing node level. In one or more embodiments, storage subsystem 204 issues a CI LD or CI ST (with a matching address) at a scope indicated by a scope value stored in scope field 207 of BAR 206 or a scope value stored in scope field 209 of BAR 208. As is illustrated, TSRBU 216 includes a BAR 218 that stores an address of TSRBU 216, among other information. In one embodiment of the present disclosure, mapping logic (ML) 219 provides a mapping function that determines which threads on which processing cores are associated with TSRBU 216.

The operation of each processor core 202 is supported by a multi-level volatile memory hierarchy having at its lowest level shared system memory 108, and at its upper levels one or more levels of cache memory (e.g., located in processor core 202 and storage subsystem 204). In the depicted embodiment, each processing cluster 104 includes an integrated memory controller (IMC) 214 that controls read and write access to system memory 108 within its processing cluster 104 in response to requests received from processor cores 202 and operations snooped on local interconnect 220. Local interconnect 220 may be implemented, for example, as a bused interconnect, a switched interconnect, or a hybrid interconnect.

The cache memory hierarchy of processing cluster 104 may include a store-through level one (L1) cache (not separately shown), which may be bifurcated into separate L1 instruction and data caches, within each processor core 202 and a level two (L2) cache (not separately shown), within storage subsystem 204, utilized by processor core 202 of processing unit 200. It should also be appreciated that a cache hierarchy may include more than two levels of cache, which may be on-chip or off-chip, in-line, lookaside, or victim cache, which may be fully inclusive, partially inclusive, or non-inclusive of the contents the upper levels of cache.

Transactions may be initiated on local interconnect 220, local interconnect 114, and/or system interconnect 110 at a scope specified by processor cores 202. That is, a processor core 202 may specify that a scope of a transaction is applicable to: an associated processing cluster 104, each of which includes multiple processing units 200 (i.e., bus 220 of an associated processing cluster 104); or an associated processing node 102, each of which includes multiple processing clusters 104, each of which includes multiple processing units 200 (i.e., bus 114 of processing node 102); or at a full system scope encompassing all processing units 200 within system 100 via buses 220, 114, and 110. Bus 220 of each processing cluster 104 is coupled to an associated bus 114 via a bus interface unit (BIU) 212.

Each processing cluster 104 further includes an instance of response logic 210, which implements a portion of a distributed coherency signaling mechanism that maintains cache coherency within data processing system 100. Finally, each processing cluster 104 includes an integrated I/O (input/output) controller 230 supporting the attachment of one or more I/O devices, such as I/O device 232. I/O controller 230 may issue operations on local interconnects 220 and 114 and/or system interconnect 110 in response to requests by I/O device 232. As noted above with respect to FIG. 1, TSRBU 116 is coupled to each PU 200 (see FIG. 2) in PC 104 via communication lines 122. Similarly, communication lines 222a-222d couple TSRBU 216 to PUs 200a-200d, respectively.

Figure 3:
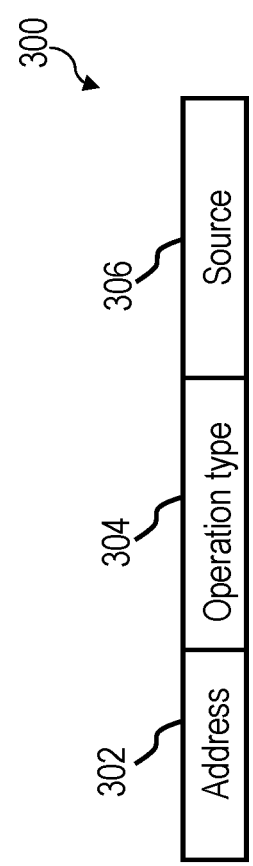
FIG. 3 depicts an exemplary structure of a cache-inhibited (CI) operation, according to one aspect of the present disclosure.

With reference to FIG. 3, an exemplary structure for a cache-inhibited (CI) bus operation 300, e.g., a cache-inhibited (CI) load (LD) or store (ST) bus operation, is illustrated according to aspects of the present disclosure. CI operation 300 includes an address field 302, an operation type field 304, and a source field 306. Address field 302 provides a device address for a device to which operation 300 is directed, operation type field 304 provides an indication of whether the CI operation is a LD operation or a ST operation, and source field 306 indicates a master (e.g., a processor core 202 and software thread within that core) that is the source of the CI operation and to which CI LD data should be returned or from which CI ST data should be provided. It should be appreciated that a system control software may be configured to store values into BARs 206 and 208 of storage subsystem 204 to create a mapping between processor cores 202 and TSRBUs 216 and 116.

Figure 4A:
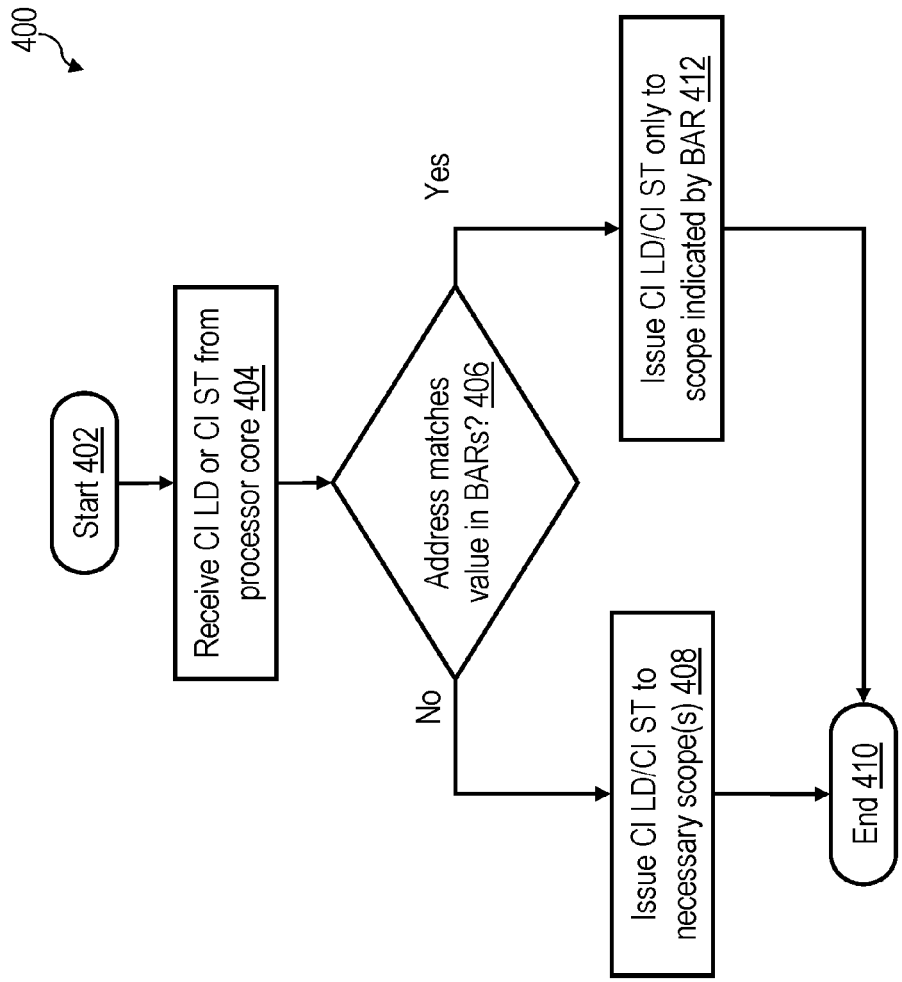
FIG. 4A depicts a flowchart of an exemplary process implemented by a storage subsystem included in one of the PUs of FIG. 2 to issue CI operations at an indicated scope.

With reference to FIG. 4A, an exemplary process 400 is illustrated that is executed by a storage subsystem 204 configured according to one or more embodiments of the present disclosure. In block 402 process 400 is initiated, at which point control transfers to block 404. In block 404 storage subsystem 204 receives a CI LD or a CI ST from processor core 202. Next, in decision block 406 storage subsystem determines whether an address of the CI LD or CI ST matches an address in an associated base address register (BAR) 206 or BAR 208. In response to the address of the CI LD or CI ST not matching the address stored in BARs 206 and 208, control transfers from block 406 to block 408. In block 408 storage subsystem 204 issues the CI LD or CI ST at an appropriate scope or scopes. As previously discussed, a scope may correspond to, for example, a processing cluster level, a processing node level, or a full system level. From block 408 control transfers to block 410, where process 400 terminates. In response to the address of the CI LD or CI ST matching the address stored in BAR 206 or BAR 208, control transfers from block 406 to block 412. In block 412 storage subsystem 204 issues the CI LD or CI ST at a scope indicated by a scope value stored in scope field 207 of BAR 206 or a scope value stored in scope field 209 of BAR 208. For a TSRBU to be replicated more than once in system 100 the scope of the broadcast in block 412 must be less than the full system scope. From block 412 control transfers to block 410.

With reference to FIG. 4B, an exemplary process 440 is illustrated that is executed by a TSRBU (i.e., TSRBU 216 and/or TSRBU 116) configured according to one or more embodiments of the present disclosure. While the discussion below focuses on TSRBU 216 for brevity, it should be appreciated that TSRBU 116 functions in a similar manner. In block 442 process 440 is initiated, at which point control transfers to block 444. In block 444 TSRBU 216 receives a CI LD operation or a CI ST operation from processor core 202. Next, in decision block 446, TSRBU 216 determines whether an address of the CI LD operation or CI ST operation matches an address in an associated base address register (BAR) 218. In response to the address of the CI LD operation or CI ST operation not matching the address stored in BAR 218, control transfers from block 446 to block 448. In block 448 TSRBU 216 ignores the CI LD operation or CI ST operation with the non-matching address. From block 448 control transfers to block 450, where process 400 terminates. In response to the address of the CI LD operation or CI ST operation matching the address stored in BAR 218, control transfers from block 446 to block 452. In block 452 TSRBU 216 processes the CI LD operation or CI ST operation, as TSRBU 216 has knowledge that a scope of the operation is limited, in this case, to a processing cluster level that can contain only this instance of the TSRBU. From block 452 control transfers to block 450.

Figure 5B:
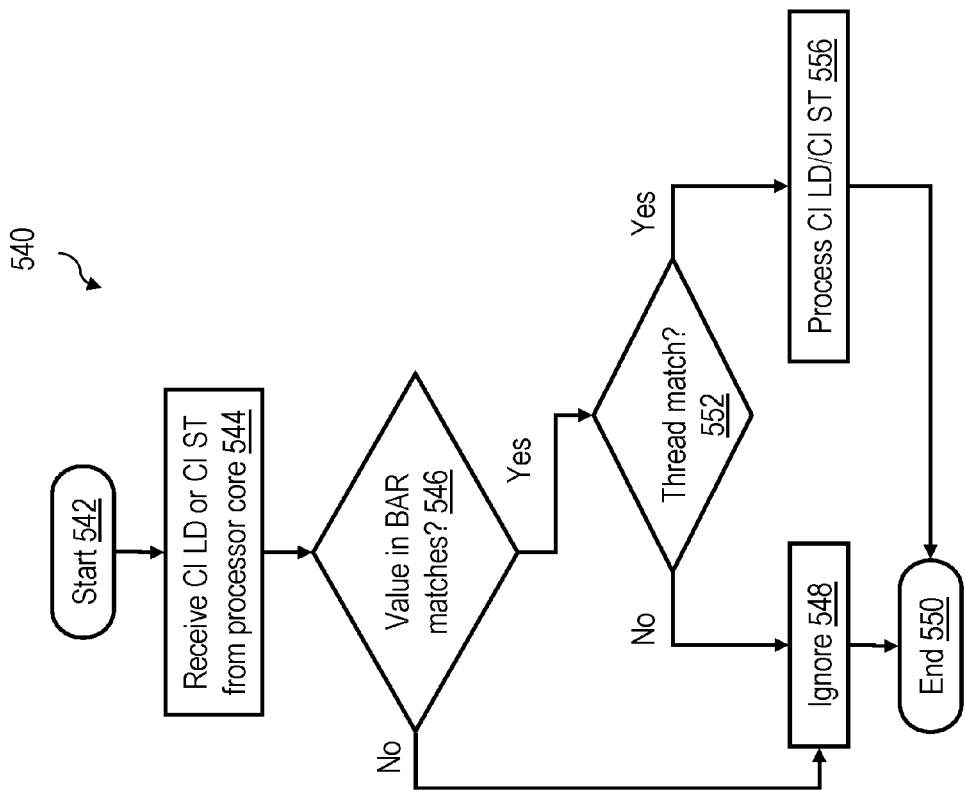
FIG. 5B depicts a flowchart of an exemplary process implemented by a TSRBU included in one the PCs of FIG. 1 to handle a CI operation, according to yet another embodiment of the present disclosure.
Figure 5A:
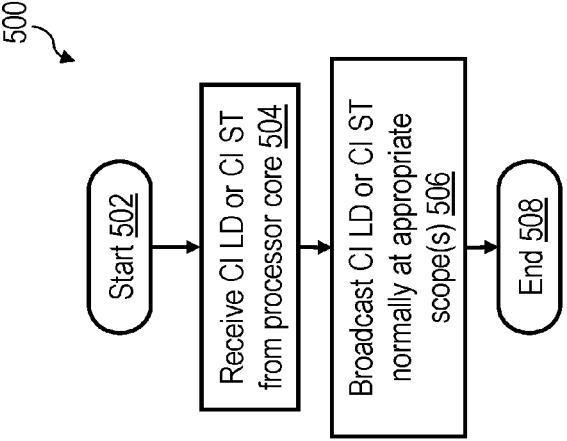
FIG. 5A depicts a flowchart of an exemplary process implemented by a topology specific replicated bus unit (TSRBU) included in one the PCs of FIG. 1 to handle a CI operation, according to another embodiment of the present disclosure.

With reference to FIG. 5A, an exemplary process 500 is illustrated that is executed by a storage subsystem 204 configured according to one or more embodiments of the present disclosure. In this embodiment, a storage subsystem 204 does not include BARs 206 and 208 and may not utilize broadcast scopes. In such an embodiment, CI LD operations and CI ST operations may be broadcast to the entire data processing system 100 or may be broadcast to a scope or scopes containing more than one TSRBU associated with the given address. It should be appreciated that each TSRBU 216 in each processing cluster 104 utilizes a same address (e.g., address '1000') and that each TSRBU 116 in each processing node 102 utilizes a same address (e.g., address '2000') that is different from the address utilized for TSRBUs 216. While two levels of TSRBUs are illustrated, it should be appreciated that TSRBUs may be replicated at more or less than two levels. While the discussion below focuses on TSRBU 216 for brevity, it should be appreciated that TSRBU 116 functions in a similar manner.

As mentioned above, TSRBU 216 communicates with all PUs 200 within a single PC 104, while TSRBU 116 communicates with all PUs 200 within all PCs 104 within a processing node 102. In block 502 process 500 is initiated, at which point control transfers to block 504. In block 504, storage subsystem 204 receives a CI LD operation or a CI ST operation from processor core 202. Next, in block 506, storage subsystem 204 broadcasts the received CI LD operation or CI ST operation to the appropriate scope or scopes as necessary to deliver the CI LD or CI ST bus operations to the appropriate TSRBU 216. From block 506 control transfers to block 508, where process 500 terminates.

With reference to FIG. 5B, an exemplary process 540 is illustrated that is executed by a TSRBU (i.e., TSRBU 216 and/or TSRBU 116) configured according to one or more embodiments of the present disclosure. As above, the discussion below focuses on TSRBU 216 for brevity. In block 542 process 540 is initiated, at which point control transfers to block 544. In block 544 TSRBU 216 receives a CI LD operation or a CI ST operation from processor core 202. Next, in decision block 546, TSRBU 216 determines whether an address of the CI LD operation or CI ST operation matches an address in an associated base address register (BAR) 218. In response to the address of the CI LD operation or CI ST operation not matching the address stored in BAR 218, control transfers from block 546 to block 548. In block 548 TSRBU 216 ignores the CI LD operation or CI ST operation with the non-matching address. From block 548 control transfers to block 550, where process 500 terminates.

In response to the address of the CI LD operation or CI ST operation matching the address stored in BAR 218 in block 546, control transfers to decision block 552. In block 552 matching logic 219 within TSRBU 216 determines whether a source value in source field 306 of the operation matches a thread assigned to TSRBU 216. In response to a source value in source field 306 not matching a thread assigned to TSRBU 216, control transfers from block 552 to block 548. In response to a source value in source field 306 matching a thread assigned to TSRBU 216, control transfers from block 552 to block 556, where TSRBU 216 processes the CI LD operation or CI ST operation on behalf of the source thread identified by source field 306. From block 556 control transfers to block 550.

Accordingly, techniques have been disclosed herein that advantageously address topology specific replicated bus units in a data processing system at a given level using a same address.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of handling cache-inhibited operations in a data processing system, comprising:
    receiving, at a replicated bus unit, a cache-inhibited (CI) operation;
    determining, by the replicated bus unit, whether an address of the CI operation matches an address for the replicated bus unit and whether a source indicated by the CI operation is a source that is serviced by the replicated bus unit;
    in response to the address of the CI operation matching the address for the replicated bus unit and the source indicated by the CI operation being a source that is serviced by the replicated bus unit, processing, by the replicated bus unit, the CI operation; and
    in response to the address of the CI operation not matching the address for the replicated bus unit or the source indicated by the CI operation not being a source that is serviced by the replicated bus unit, ignoring, by the replicated bus unit, the CI operation.

2. The method of claim 1, wherein the replicated bus unit is included in a processing cluster.

3. The method of claim 1, wherein the replicated bus unit is included in a processing node.

4. The method of claim 1, wherein the replicated bus unit includes a base address register (BAR) that stores the address of the replicated bus unit.

5. The method of claim 1, wherein the CI operation is a CI load operation or a CI store operation.

6. The method of claim 1, wherein the replicated bus unit is an interrupt controller.

7. The method of claim 1, further comprising:
    returning, by the replicated bus unit, data to the source indicated by the CI operation.

8. The method of claim 7, wherein the source corresponds to a master located within a storage subsystem.

* * * * *